Patented Jan. 16, 1940

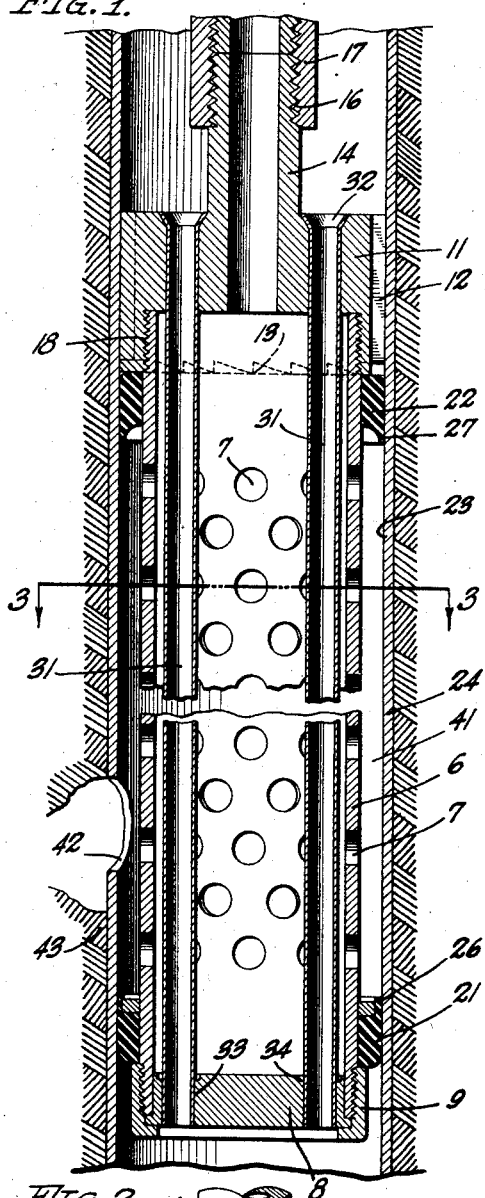

2,187,275

UNITED STATES PATENT OFFICE 2,187,275

MEANS FOR LOCATING AND CEMENTING OFF LEAKS IN WELL CASINGS

Amos N. McLennan, Maywood, Calif.

Application January 12, 1937, Serial No. 120,211

7 Claims. (Cl. 166—1)

This invention relates to the art of locating and repairing leaks in casing of the type commonly used in oil wells.

One of the difficulties frequently encountered in the exploitation of an oil well is that the casing, or tubular metal lining of the well bore, is subject to the development of leaks after its insertion into the bore. Such leaks may develop at the couplings between sections of the pipe of which the casing is composed, or they may be holes in the sections themselves caused by the corrosive action of the various chemicals contacting the casing during its normal life time, or by friction developed by movement of the pump rod against the wall of the casing. In any event, a leak in the casing of a well must be repaired, as otherwise the production of oil from that well will seriously be interfered with or stopped entirely, because of the leakage into the casing of mud, water, sand, or other materials to contaminate the oil.

Whereas leaks of this nature have frequently been repaired in the past, the method commonly employed is almost prohibitively expensive because it entails inserting a wooden plug into the casing below the leak, pouring a large amount of cement into the casing, and, after the cement has hardened, drilling out the concrete within the casing and the wooden plug. This method necessitates the use of a very large amount of cement, because of the fact that the casing to be repaired is often filled with mud or water, which, of course, dilutes the cement so as to render it useless unless sufficiently great quantities thereof be used to nullify the diluting effect of the mud or water. Moreover, the entire procedure is often entirely in vain, inasmuch as the cement frequently fails to penetrate and fill the hole in the casing responsible for the leak to be repaired.

It is an object of the present invention, therefore, to provide a method of repairing a leak in well casing, termed in the field "cementing off", which can be relied upon to stop the leak effectively.

A further object is to make it possible to perform this highly desirable function with a high degree of certitude as to its efficacy, and yet without requiring that more than a very small quantity of cement be employed.

Another object is to provide a method of "cementing off" as above described, in the performance of which provision is made for the removal of excess hardened cement from the casing so as to make the casing ready for subsequent pumping operations, with the greatest ease and within an absolute minimum of time.

A further object of the present invention is to provide a very simple and inexpensive apparatus for carrying out the method above referred to.

Yet another object is to provide an apparatus of the general character indicated, which greatly facilitates the accurate location of any leak which has developed in a casing, regardless of its depth below the surface of the ground, as well as the method of employing the apparatus to that end.

A still further object of the present invention is to provide an apparatus of the general character indicated, which is adapted, either in the same form or by slight modification, for use in treating an oil well with acid to enhance or reestablish its flow of oil.

The invention possesses other objects and features of advantage, some of which, with the foregoing, will be set forth in the following description of the preferred embodiment of my invention which is illustrated in the drawing accompanying and forming a part of the specification. It is to be understood that I do not limit myself to the showing made by the said drawing and description, as I may adopt variations of the preferred form within the scope of my invention as set forth in the claims.

Referring to the drawing:

Figure 1 is a vertical, longitudinal, medial sectional view of a "cementing off" tool embodying the principles of the present invention and whereby the method also constituting a portion of the present invention can be carried out. The tool is shown in operative position with relation to a leak in a well casing to be repaired.

Figure 2 is a view in side elevation of the upper end of the tool of Figure 1, showing the cutter.

Figure 3 is a transverse, horizontal sectional view taken upon the line 3—3 of Figure 1 with the direction of view as indicated.

Figure 4 is a view in side elevation partly broken away, showing a slightly modified form of tool used in treating a well with acid.

My improved leak-locating and cementing off tool comprises a tubular body 6 having a plurality of perforations 7 in its cylindrical wall and closed at its lower end by a base plug 8 adapted to slip into the end of the body 6 and to be retained therein by an internal threaded ferrule or retaining nut 9. The upper end of the body 6 is closed by an upper head 11 carrying, preferably integral with cutter teeth 12 and 13 on the outer peripheral face and bottom surface, respectively, of the head 11. Also carried by the head 11 is a tubular coupling member 14 having threads 16 permitting attachment of the device to the lower end of a string of pipe 17. The head 11 is attached to the upper end of the body 6 through the expedient of threads 18.

The body 6 carries a pair of spaced packings 21 and 22 adjacent the lower and upper heads 9 and 11, respectively, of suitable resilient material such as rubber or leather. Preferably they take the form of conventional cup washers, and are of such diameter that they are adapted to fit the bore 23 of the casing 24 in conjunction with which the tool is to be employed. The packings 21 and 22 are positioned with their annular flanges 26 and 27, respectively, facing toward each other so as to enhance the tightness with which the packings fit the casing 24 when pressure is imposed upon fluid entrapp d within the casing 24 within the packings.

In order to permit lowering the tool through the casing 24 when the casing is filled with mud, water, oil, or the like, the tool is provided with preferably a plurality of tubes 31 extending longitudinally of the tool and throughout the entire distance between the outer surfaces of the heads 9 and 11, thus providing passages through which the materials in the casing can flow as the tool is lowered therepast. These tubes 31 are swaged at their upper ends 32 into a fluid-tight engagement with the upper head 11, and extend through suitable apertures 33 in the lower head 8, permitting the head 8 to be split thereover when the tubes 31 are in place, after which the ferrule portion 9 of the head can be screwed into clamping position. Preferably each of the tubes 31 is provided with a suitable ring 34 where it enters the lower head 8. The tubes 31 are positioned inside the body 6.

The body 6 is only slightly smaller in diameter than the casing 24, the purpose being to leave a cylindrical space 41 between the body 6 and the casing 24, which is relatively thin for a reason to be explained hereinbelow.

The tool hereinabove described is used for finding a leak such as that presented by a hole 42 in the casing 24 and for cementing off the hole 42 so as to permit resumption of the pumping operations which have been impaired or interrupted by the development of the hole 42. To locate the leak 42, the tool is secured to the lower end of a string of pipe 17 and lowered slowly through the casing 24, pressure being maintained in the pipe 17 and body 6 by connecting the upper end of the pipe 17 to a suitable pump adapted to force liquid thereinto. This pressure, of course, is transmitted to the cylindrical space 41 between body 6 and casing 24, i. e., that portion of the casing 24 lying between the confines of the packings 21 and 22, because of the presence of the foramina 7 in the body 6. It is apparent, therefore, that just as soon as the lower packing 21 passes any portion of the hole 42 the pressure suddenly will be relieved. The drop in pressure will be made manifest by a sudden speeding up of the pump maintaining such pressure or by movement of the hand of the pressure gauge associated therewith. Accordingly the operator will immediately be apprised as to the precise distance of the leak below the surface of the ground because he knows how much pipe 17 has been employed to lower the tool into registry therewith.

Having thus located the hole 42 accurately, the method of cementing off comprises lowering a "bailer" of green, i. e., semi-fluid cement, through the pipe 17 (the tool being left in position with the hole 42 between the upper and lower packings 22 and 21) until the bailer enters the body 6 whereupon the contents of the bailer are emptied, either automatically or otherwise, into the body 6 and the bailer then withdrawn. Even though the body 6 be filled with water, mud, or the like, the presence of such material within the body 6 will not cause undue contamination of the cement because the cement is not required to move through the liquid for any appreciable distance but is emptied out of the bailer while the bailer is disposed closely adjacent the position the cement will assume within the body 6. Should it prove desirable to employ more than one bailer full of cement, the step of delivering cement to the body 6 by the bailer may be repeated as often as necessary. When a suitable amount of cement has been delivered to the body 6 as above described pressure is again imposed on the contents of the body by again connecting the upper end of the pipe 17 to the pump. This pressure forces the cement, which is still in a semi-fluid state, outwardly through the foramina 7 to the cylindrical space 41 where a portion of the cement will encounter the hole 42 and be forced therethrough into the formation 43 surrounding the casing 24.

After this has been done the entire structure is permitted to stand idle for a predetermined period, say a quarter of an hour, the length of this period being determined by the nature of the cement used. When the cement has taken its initial set, the entire tool is rotated within the casing 24 and through approximately a quarter turn, this being accomplished by turning the pipe 17 at the ground level. This movement of the body 6 serves to break the bond between that portion of the hardening cement lying within the cylindrical space 41 and that which is within the body 6. After again permitting the entire structure to remain motionless for a suitable period, it is again given a quarter turn, and this is repeated as many times as necessary to insure that a sleeve of cement will harden within the space 41 and be separated from the cement which will have hardened within the body 6.

The structure then preferably is permitted to stand idle relatively for a long period, say for from 24 to 48 hours to insure complete hardening of the cement. Upon termination of a suitable period the tool is caused to rotate and is lowered gradually. This will cause the cutter teeth 13 carried by the upper head 11 first to disintegrate the upper packing 22 and then to disintegrate the relatively thin sleeve of concrete which has hardened within the cylindrical space 41. This disintegration, or drilling away, will be performed relatively speedily because the cylinder of concrete is so thin. The teeth 12 on the peripheral face of the head 11 will operate to smooth the bore of the casing 24 as the tool moves downward.

It is obvious, therefore, that the concrete that has hardened within the hole 42 and that which has hardened outside the casing 24 will operate efficiently and with a high degree of efficacy to seal the hole 42 and prevent any further influx of contaminating materials into the casing 24 after removal of the tool therefrom and resumption of pumping.

The tool also finds utility in performing the operation known in the field as "acidizing" a well, the purpose of which is to eat away a quantity of limestone formation surrounding the sump of that portion of the casing which is perforated to permit influx of oil thereto, and thereby permit of a more rapid flow of oil into the casing. It previously has been customary to pour a large quantity of acid into the casing of a well thus to be treated in the frequently vain hope that some of the acid will reach the perforations in sufficiently concentrated form to be effective in dissolving the limestone. Obviously this procedure is very expensive because of the large quantity of acid required and is of exceedingly doubtful efficacy. The cost of acidizing can be greatly reduced, and the assurance of its effectiveness established by applying the acid through the expedient of the tool hereinabove described or by that embodiment thereof which is illustrated upon Figure 4 and which is the same as that previously described except for the fact that the head 11' whereby the upper end of the body 6' is closed carries no cutter. The tool is lowered until the lower and upper packings 21 and 22, respectively (or 21' and 22', respectively, as the case might be) are disposed upon opposite sides of the perforations through which it is desired that the acid be delivered. Then a relatively small quantity of acid is delivered as by a bailer to the interior of the body 6 which is empty of liquids because of the presence of the packings. The acid, or a portion thereof, can then easily be forced through the perforations by connecting the pump to the upper end of the pipe 17 as hereinabove described. If one bailer full of acid should not prove to be sufficient as many more as necessary may be utilized and the acid forced into the formation under pressure as described, thus insuring adequate treatment of the formation by acid even though a much smaller quantity of acid be employed than by previous methods.

I claim:

1. A tool for repairing leaks in casing comprising a tubular body having perforations in its wall, means for lowering said body into a casing and for introducing cementitious material under pressure to said body while within said casing, spaced packing means carried by said body and engaging said casing to confine cementitious material passing through said perforations to that portion of said casing between said packings, and means carried by said body and operable without removal of said tool from said casing after introduction of said cementitious material for removing hardened cementitious material from the space between said body and casing.

2. A tool for repairing leaks in casing comprising a tubular body having perforations in its wall, means for lowering said body into a casing and for introducing cementitious material under pressure to said body while within said casing, spaced packing means carried by said body and engaging said casing to confine cementitious material passing through said perforations to that portion of said casing between said packings, and a cutter carried by said body and adapted to be operated by said lowering means to disintegrate hardened cementitious material in the space between said body and casing.

3. A tool for repairing leaks in casing comprising a tubular body having perforations in its wall, means for lowering said body into a casing and for introducing cementitious material under pressure to said body while within said casing, spaced packing means carried by said body and engaging said casing to confine cementitious material passing through said perforations to that portion of said casing between said packings, and a cutter carried by said body outside the space between said packings and adapted to disintegrate hardened cementitious material between said body and casing.

4. A tool for repairing leaks in casing comprising a tubular body having perforations in its wall, means for lowering said body into a casing and for introducing cementitious material under pressure to said body while within said casing, spaced packing means carried by said body and engaging said casing to confine cementitious material passing through said perforations to that portion of said casing between said packings, and a cutter carried by said body outside the space between said packings and adapted to disintegrate the proximal packing and hardened cementitious material between said body and casing.

5. A tool for repairing leaks in casing comprising a tubular body having perforations in its wall, means for lowering said body into a casing and for introducing cementitious material under pressure to said body while within said casing, spaced packing means carried by said body and engaging said casing to confine cementitious material passing through said perforations to that portion of said casing between said packings, means providing a passage extending longitudinally of said tool past both of said packings and out of communication with the space between said packings means excluding material within said casing from the interior of said body except through said passage-providing means, said passage-providing means establishing communication between the portions of said casing on opposite sides of said tool to permit movement of said tool through a casing containing fluid, and means carried by said body for removing hardened cementitious material from the space between said body and casing.

6. A tool for repairing leaks in casing comprising a tubular body having perforations in its wall, means for lowering said body into a casing and for introducing cementitious material under pressure to said body while within said casing, spaced packing means carried by said body and engaging said casing to confine cementitious material passing through said perforations to that portion of said casing between said packings, means providing a passage extending longitudinally of said tool past both of said packings and out of communication with the space between said packings, said passage-providing means establishing communication between the portions of said casing on opposite sides of said tool to permit movement of said tool through a casing containing fluid, and a cutter carried by said body outside the space between said packings and adapted to disintegrate the proximal packing and hardened cementitious material between said body and casing.

7. A tool for repairing leaks in casings comprising a tubular body having a perforation in its wall, means for lowering said body into a casing and for introducing cementitious material under pressure to said body while within said casing, spaced packing means carried by said body and engaging said casing to confine cementitious material passing through said perforation to that portion of said casing between said packings, means establishing communication between the portions of said casing on opposite sides of said tool without establishing communication with any of the space within said tool except that within said communication-establishing means, and means for removing hardened cementitious material from the space between said body and casing.

AMOS N. McLENNAN.